(12) United States Patent
Eban et al.

(10) Patent No.: US 11,429,894 B2
(45) Date of Patent: Aug. 30, 2022

(54) CONSTRAINED CLASSIFICATION AND RANKING VIA QUANTILES

(71) Applicant: Google LLC, Mountain View, CA (US)

(72) Inventors: Elad Edwin Tzvi Eban, Sunnyvale, CA (US); Alan Mackey, Mountain View, CA (US); Xiyang Luo, Pasadena, CA (US)

(73) Assignee: GOOGLE LLC, Mountain View, CA (US)

( * ) Notice: Subject to any disclaimer, the term of this patent is extended or adjusted under 35 U.S.C. 154(b) by 532 days.

(21) Appl. No.: 16/288,217

(22) Filed: Feb. 28, 2019

(65) Prior Publication Data
US 2019/0266513 A1 Aug. 29, 2019

Related U.S. Application Data

(60) Provisional application No. 62/636,745, filed on Feb. 28, 2018.

(51) Int. Cl.
*G06N 20/00* (2019.01)

(52) U.S. Cl.
CPC .................... *G06N 20/00* (2019.01)

(58) Field of Classification Search
CPC ........... G06N 20/00; G06N 3/08; G06N 3/084
See application file for complete search history.

(56) References Cited

PUBLICATIONS

Pillai et. al., "Threshold optimization for multi-label classifiers", 2013, Pattern Recognition, vol. 46, pp. 2055-2065 (Year: 2013).*
Wei et al., "An Investigation of Quantile Function Estimators Relative to Quantile Confidence Interval Coverage", 2015, Communications in Statistics—Theory and Methods, vol. 44, pp. 2107-2135 (Year: 2015).*
Zemel et al., "Learning Fair Representations", Jun. 28, 2013, Proceedings of the 30th International Conference on International Conference on Machine Learning, vol. 28, pp III-325-III-333 (Year: 2013).*
Pedregosa, "Surrogate Loss Functions in Machine Learning", Jun. 20, 2014, http://fa.bianp.net/blog/2014/surrogate-loss-functions-in-machine-learning/, Jun. 20, 2014, pp. 1-9 (Year: 2014).*

(Continued)

*Primary Examiner* — Ann J Lo
*Assistant Examiner* — Leonard A Sieger
(74) *Attorney, Agent, or Firm* — Dority & Manning, P.A.

(57) ABSTRACT

Example aspects of the present disclosure are directed to systems and methods for learning classification models which satisfy constraints such as, for example, constraints that can be expressed as a predicted positive rate or negative rate on a subset of the training dataset. In particular, through the use of quantile estimators, the systems and methods of the present disclosure can transform a constrained optimization problem into an unconstrained optimization problem that is solved more efficiently and generally than the constrained optimization problem. As one example, the unconstrained optimization problem can include optimizing an objective function where a decision threshold of the classification model is expressed as an estimator of a quantile function on the classification scores of the machine-learned classification model for a subset of the training dataset at a desired quantile.

20 Claims, 8 Drawing Sheets

CLASSIFIER 1

CLASSIFIER 2

CLASSIFIER 3

(56) References Cited

PUBLICATIONS

Ko et al., "Background Subtraction on Distributions", 2008, Computer Vision—ECCV 2008, vol. 2008, pp. 276-289 (Year: 2008).*
Faghri et al., "VSE++: Improving Visual-Semantic Embeddings with Hard Negatives", 2017, https://arxiv.org/abs/1707.05612v2, Version 2, pp. 1-10 (Year: 2017).*
Ferdowsi et al., "Online Active Learning with Imbalanced Classes", 2013, 2013 IEEE 13th International Conference on Data Mining, vol. 13(2013), pp. 1043-1048 (Year: 2013).*
Amirou et al., "Optimizing the classification cost using SVMs with a double hinge loss", 2014, Informatica, vol. 38, pp. 125-133 (Year: 2014).*
Wikipedia, "Loss Function", Retrieved 2021, https://en.wikipedia.org/wiki/Loss_function, 2021, p. 1—supplementary evidence (Year: 2021).*
Goel, "Duality", 2008, Stanford University, 2008, pp. 83-110—supplementary evidence, existence of dual minimization problem for maximization problem, and vice versa (Year: 2008).*
Zheng, "QBoost: Predicting quantiles with boosting for regression and binary classification", 2012, Expert Systems with Applications, vol. 39, pp. 1687-1697 (Year: 2012).*
Boyd et al., "Accuracy at the Top", 2012, Advances in Neural Information Processing Systems 25 (NIPS 2012), vol. 25 (2012), pp. 1-9 (Year: 2012).*

* cited by examiner

CONSTRAINED CLASSIFICATION AND RANKING VIA QUANTILES

PRIORITY CLAIM

The present application is based on and claims priority to U.S. Provisional Application 62/636,745 having a filing date of Feb. 28, 2018, which is incorporated by reference herein.

FIELD

The present disclosure relates generally to machine learning. More particularly, the present disclosure relates to systems and methods for learning classification models which satisfy constraints via the use of quantile estimators.

BACKGROUND

In most machine learning applications, classification accuracy is not the primary metric of interest. Binary classification models which face class imbalance are often evaluated by the $F_\beta$ score, area under the precision-recall curve, Precision at K, and more. Thus, in many real-world applications, machine learning classification systems do not simply make predictions to minimize errors or to maximize likelihood.

Instead, a decision threshold of a machine-learned classification model is often adjusted after training to select a particular operating point on the precision-recall or ROC curve, reflecting how the classification model will be used. As one example, automated email spam filters might be adjusted to operate with an increased threshold to achieve a high precision or low predicted positive rate. As another example, in medical diagnosis, the threshold can be decreased so that the classification model will make predictions with a high recall.

When a particular operating point for the classification model is not known ahead of time, area under the precision-recall or ROC curve is often the metric used to compare models. In other cases, classification models are adjusted to obey constraints on coverage or fairness (e.g., predicted positive rates on subsets of the training dataset) so that the system will not treat some demographics of users unfairly.

In all of these cases, the most desirable binary classification model can be characterized as one which maximizes a quantity such as accuracy, precision, or recall, subject to a constraint. The constraint is usually an inequality on the predicted positive rate (e.g., coverage) or true/false positive/negative rate on some subset of the data.

The most common practice to produce a classification model which satisfies a constraint is to train the classification model by maximum likelihood and then, after training, adjust its threshold so that the constraint is satisfied. That is, a machine-learned classification model is first trained to optimize classification accuracy, and then subsequently the decision threshold of the model is adjusted to obtain desired model performance according to some other metric.

Threshold adjustment enjoys a strong theoretical justification: for a large family of metrics, the Bayes optimal classification model makes predictions by thresholding the conditional class probability $P(y=1|x)$. However, a fundamental flaw of the threshold adjustment method is that a given classification model can be suboptimal when its threshold is adjusted in order to reach a desired operating point on the precision-recall curve.

Further, thresholding is not the end of the story because learning accurate (or calibrated) conditional probabilities is more challenging than learning loss-minimizing predictions. This observation is a fundamental motivation for structured losses and there have been several attempts to address constrained classification problems directly through the machinery of constrained optimization. However, constrained optimization problems are more challenging and resource-intensive to solve than unconstrained optimization problems.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for training a machine-learned classification model to satisfy a constraint. The method includes obtaining, by one or more computing devices, data descriptive of the machine-learned classification model. The machine-learned classification model is configured to produce a classification score for an input and to classify the input by comparing the classification score to a decision threshold. The method includes training, by the one or more computing devices, the machine-learned classification model based at least in part on a training dataset. Training, by the one or more computing devices, the machine-learned classification model includes optimizing, by the one or more computing devices, an unconstrained objective function in which the decision threshold of the machine-learned classification model is expressed as an estimator of a quantile function on the classification scores of the machine-learned classification model for a subset of the training dataset at a desired quantile. The desired quantile is based at least in part on a rate value associated with the constraint.

Another example aspect of the present disclosure is directed to a computing system. The computing system includes one or more processors and one or more non-transitory computer-readable media that collectively store instructions that, when executed by the one or more processors cause the computing system to perform operations. The operations include obtaining data descriptive of the machine-learned classification model. The machine-learned classification model is configured to produce a classification score for an input and to classify the input by comparing the classification score to a decision threshold. The operations include, for each of a plurality of iterations, obtaining a first minibatch of training data from a training dataset. The operations include, for each of the plurality of iterations, obtaining a second minibatch of training data from a specified subset of the training dataset. The operations include, for each of the plurality of iterations, determining a gradient of a loss function that describes a classification performance of the machine-learned classification model on the first minibatch of training data. The loss function expresses the decision threshold of the machine-learned classification model as an estimator of a quantile function on the classification scores of the machine-learned classification model for the second minibatch of training data at a desired quantile. The desired quantile is based at least in part on a rate value. The operations include, for each of the plurality of iterations, updating one or more of a plurality of learnable parameters of the machine-learned classification model based at least in part on the gradient of the loss function.

Another example aspect of the present disclosure is directed to one or more non-transitory computer-readable media that collectively store instructions that, when executed by one or more processors, cause the one or more processors to perform operations. The operations include obtaining data descriptive of a machine-learned classification model. The machine-learned classification model is configured to produce a classification score for an input and to classify the input by comparing the classification score to a decision threshold. The operations include training the machine-learned classification model based at least in part on a training dataset. The operation of training the machine-learned classification model includes optimizing an objective function in which the decision threshold of the machine-learned classification model is expressed as an estimator of a quantile function on the classification scores of the machine-learned classification model for a subset of the training dataset at a desired quantile. The desired quantile is based at least in part on a rate value associated with a constraint.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
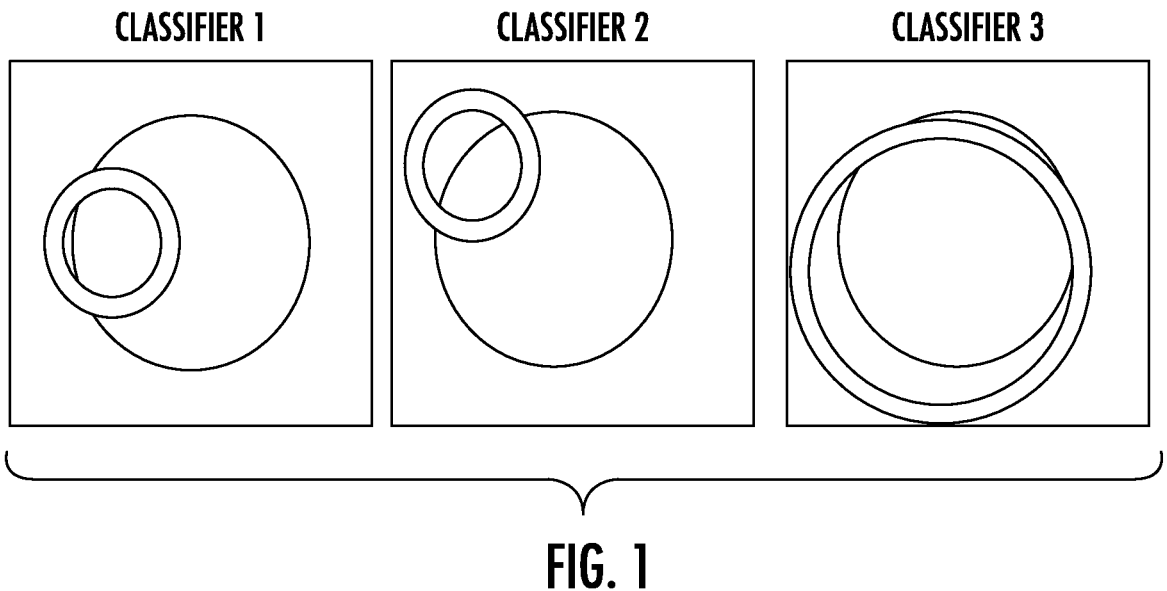
FIG. 1 depicts a graphical diagram of the performance of three example classification models.

Reference numerals that are repeated across plural figures are intended to identify the same features in various implementations.

DETAILED DESCRIPTION

1. Overview and Example Applications

Example aspects of the present disclosure are directed to systems and methods for learning classification models which satisfy constraints such as, for example, constraints that can be expressed as a predicted positive rate or negative rate on a subset of the training dataset. In particular, through the use of quantile estimators, the systems and methods of the present disclosure can transform a constrained optimization problem into an unconstrained optimization problem that is solved more efficiently and generally than the constrained optimization problem. As one example, the unconstrained optimization problem can include optimizing an objective function where a decision threshold of the classification model is expressed as an estimator of a quantile function on the classification scores of the machine-learned classification model for a subset of the training dataset at a desired quantile.

The systems and methods described herein are model-agnostic and only marginally more expensive than minimization of a traditionally-formulated unconstrained loss. For example, depending on the model type, gradient-based optimization approaches can be used to solve the unconstrained optimization problem, which are significantly more efficient in terms of consumed computing resources than systems which solve constrained optimization problem. Furthermore, because the classification models produced according to the present disclosure are explicitly optimized for use in a particular regime (e.g., to satisfy a particular constraint), when used in that regime the models of the present disclosure will often significantly outperform a standard classification model operating with a threshold that was adjusted post-training. In particular, experiments on a variety of benchmarks have shown competitive performance relative to existing baselines.

More particularly, as described in the Background section above, the vast majority of machine learning systems are built with an accuracy-based training objective, which has the property of generating a correct prediction on average. This average performance property has deep theoretical roots and works well in practice.

However, in many contexts the performance of the machine learning system is evaluated by other metrics which may differ dramatically from accuracy. In one example application, classification models can be used in anti-abuse pipelines which seek to identify (e.g., classify as such) abusive content. For example, imagine an anti-abuse setting where 100 out of 1000 web sites contain abusive content of some form. Consider three classification models, all with 95% classification accuracy with the following error pattern:

|  | Correctly classified abusive sites | Correctly classified benign sites | Accuracy |
|---|---|---|---|
| Classification Model 1 | 51 | 899 | 95% |
| Classification Model 2 | 75 | 875 | 95% |
| Classification Model 3 | 99 | 851 | 95% |

A simplified graphical diagram of the performance of these classification models is provided in FIG. 1. The large outer space corresponds to benign sites while the large inner circle corresponds to abusive sites. The space within the respective circle of changing location/diameter corresponds to the sites that are respectively classified by the respective classification model as being abusive.

Clearly, the three classification models are equally good when measured in terms of accuracy. However, they are markedly different and could be considered superb or useless depending on the way in which they will be used.

As one example, classification model 1 has high precision (98%), which is the fraction of positive predictions which are correct. This property means that sites flagged by the classification model as being abusive have a 98% chance of actually being abusive in fact, so this classification model 1 could be used to automatically block a site. The high precision will guarantee that blocked sites will almost always be abusive sites, even if the classification model misses a substantial fraction of bad sites.

As another example, classification model 3 has high recall (99%), which is the fraction of abusive sites which are detected. This property means that 99% of all abusive sites can be found among those flagged by the classification model, so it could be used to identify sites for manual review. The high recall will guarantee that all types of abuse are caught, even if the classification model also labels some benign sites as abusive.

While classification model 1 would be a good choice for automatically blocking abusive sites, it would be a poor choice for identifying all abusive sites. The opposite is true of classification model 3. In theory and in practice, there is a tradeoff between precision and recall.

In the areas of anti-abuse, fraud detection, and many other applications of machine-learned classification models, it is common that either high precision or high recall is required by the product. In some settings the ML system is required to satisfy only one of the constraints, but in many other cases a classification model is expected to have good performance (after the threshold shifting) in both the high precision and high recall setting. This "searching" of a classification model to two opposite extremes is more often than not strictly sub-optimal.

According to an aspect of the present disclosure, the systems and methods described herein provide tools that enable a user be able to pick the best of each world: A classification model that is designed for a high recall constraint and another classification model for the high precision setting.

Figure 2:
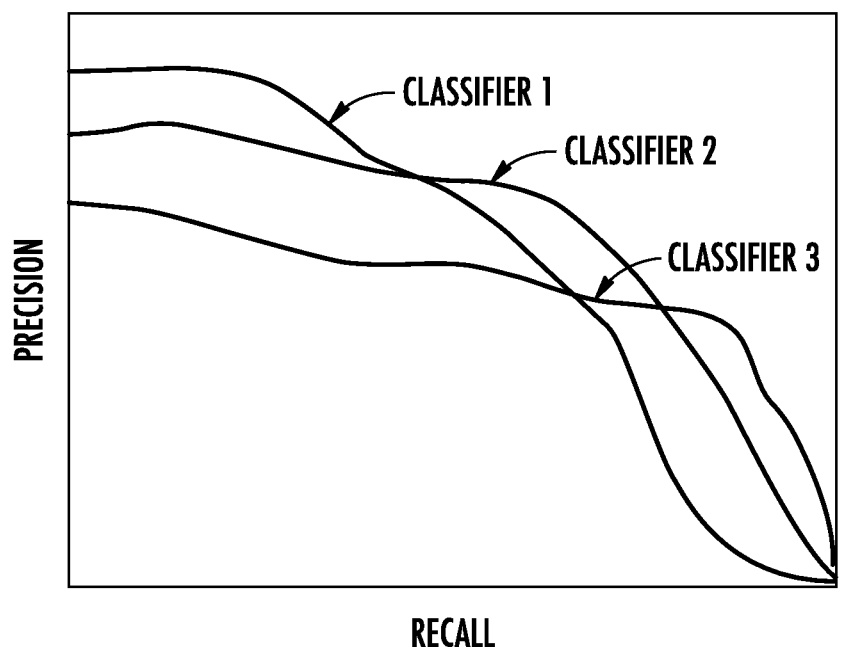
FIG. 2 depicts a graphical diagram of the precision recall curves of the three example classification models of FIG. 1.

Currently, the standard way to adjust the tradeoff between precision and recall is by adjusting, subsequent to training of a classification model, the model's threshold for determining when a positive label is predicted. A higher threshold will result with a higher precision and lower recall, and conversely a lower threshold will result in a lower precision and higher recall. Changing the threshold can be thought as moving on the precision-recall curve, as shown graphically in FIG. 2.

However, a fundamental flaw of this threshold adjustment method is that a given classification model can be suboptimal when its threshold is adjusted in order to reach a desired operating point on the precision-recall curve. Take for instance the classification circle of classification model 2 shown in FIG. 1. If used in either the high recall or high precision regimes it will be inferior to classification model 3 or 1 (respectively). Moreover, classification models 1 and 3 which have strong performance in one regime have poor performance in the other.

In contrast to the threshold adjustment technique, recent academic work has demonstrated the value of constrained optimization for machine learning with non-accuracy objectives. In particular, the maximization of the $F_\beta$ score, area under the precision-recall curve, Precision at K, and other relevant metrics can often be expressed as a constrained optimization problem, where the constraint is a function of the classification model's predictions.

The present disclosure shows that for a large class of these problems, the constraint can be eliminated by substitution using the quantile function, which can be effectively estimated in a way which is amenable to standard learning methods. Thus, in contrast to approaches which attempt to address constrained classification problems directly through the machinery of constrained optimization, the present disclosure instead focuses on eliminating the constraint by substitution.

In particular, according to an aspect of the present disclosure, for constraints which can be expressed as a rate on the training dataset (e.g. predicted positive rate), the decision threshold of a classification model which satisfies the constraint can be expressed as a quantile of the classification model's scores. By incorporating an estimator of the quantile into the loss function, the constraint can be eliminated, resulting in an unconstrained optimization problem.

Thus, according to an aspect of the present disclosure, the threshold at which a classification model must operate to satisfy the constraint can be explicitly modeled using quantile estimators, yielding a surrogate loss function which avoids the complexity of constrained optimization. In particular, in some implementations, the resulting unconstrained optimization problem can include optimizing an objective function where a decision threshold of the classification model is expressed as an estimator of a quantile function on the classification scores of the machine-learned classification model for a subset of the training dataset at a desired quantile.

In some implementations, the desired quantile can be based at least in part on a rate value associated with the constraint. For example, the rate value can be a value associated with a required predicted positive rate (e.g., coverage) or true/false positive/negative rate on a specified subset of the training dataset. In one example, the constraint can include a desired relationship (e.g., inequality) between a predicted positive rate of the machine-learned classification model on the subset of the training dataset and the rate value. According to an aspect of the present disclosure, in some implementations, the desired quantile is equal to one minus the rate value.

In some implementations, the subset of the training dataset that is considered by the quantile function corresponds to a portion of the training dataset that exhibits a particular feature value. For example, this may be the case for coverage or fairness constraints. In other implementations, the subset of the training dataset that is considered by the quantile function can correspond to or include an entirety of the training dataset.

According to another aspect of the present disclosure, a number of different quantile estimators can be used. As one example, a point estimator of the quantile function can be used. As another example, one of a number of different L-estimators of the quantile function can be used. For example, the estimator of the quantile function can be a kernel quantile estimator of the quantile function (e.g., a Gaussian kernel quantile estimator). As another example, the estimator of the quantile function can be an interval quantile estimator as described further herein.

In one example implementation, the constraint can be a precision at a fixed recall constraint and optimizing the unconstrained objective function can include minimizing a sum over all negative training examples in the training dataset of a logistic loss or a hinge loss of the classification score produced for such training example by the machine-learned classification model minus the estimator of the quantile function on the classification scores of the machine-learned classification model for all positive training examples of the training dataset at the desired quantile.

In another example implementation, the constraint can be a precision at a fixed predicted positive rate constraint and optimizing the unconstrained objective function can include minimizing a sum over all negative training examples in the training dataset of a logistic loss or a hinge loss of the classification score produced for such training example by the machine-learned classification model minus the estimator of the quantile function on the classification scores of the machine-learned classification model for all training examples of the training dataset at the desired quantile.

In yet another example implementation, the constraint can be a precision at a fixed predicted positive rate constraint and optimizing the unconstrained objective function can include minimizing a sum over all positive training examples in the training dataset of a logistic loss or a hinge loss of an inverse of the classification score produced for such training example by the machine-learned classification model plus the estimator of the quantile function on the classification scores of the machine-learned classification model for all training examples of the training dataset at the desired quantile.

The proposed quantile estimation approaches of the present disclosure enable optimization of a classification model for a particular regime (high precision, high recall, or a tradeoff between the two). Because the classification model was optimized for use in a particular regime, when used in that regime it will often significantly outperform a standard classification model with an adjusted threshold. In addition, the systems and methods of the present disclosure enjoy standard empirical risk bounds and strong performance relative to other methods and surrogates for enforcing constraints relevant to non-accuracy objectives.

The systems and methods of the present disclosure can be used for a number of different applications and provide a number of different technical effects and benefits.

As one example application, the systems and methods of the present disclosure can be used for fighting abusive content and/or malware hosting sites as described above. In one example, a high recall classification model can be appropriate for labeling of abusive content or malicious sites while a high precision classification model can be more appropriate for automatic blocking of advertisements (e.g., that point to malicious sites and/or abusive content). Thus, aspects of the present disclosure can be used to provide improved systems for combating abusive or malicious content such as abusive comments in an online forum or false "news" articles.

Another example application of the technologies described herein is to fraud detection. In fraud detection, the number of blocked transactions needs to be closely controlled in order to provide a good user experience. However, at the same time the number of fraudulent transactions should be minimized. This required balance can be handled naturally by a high precision classification model.

Another example application of the technologies described herein is to image classification. One objective of image classification to label an image with its content based only on the image. The classical use case is retrieval: given a query such as, for example, "dog show", the system (e.g., a photograph management application) seeks to produce a set of image results that are responsive to the query. In this case, a moderately high (e.g., 70%) precision constraint can be used in order to guarantee appropriate results for the users.

Another example application of the technologies described herein is image annotation. For example, given one image (e.g., possibly taken real time) the machine learning system has to predict a number K (e.g., 5) labels that describe the content of the image and is measured via the Precision@K metric.

Thus, the present disclosure provides a number of technical effects and benefits and can be used in any number of different applications. As one example technical effect and benefit, because the systems and methods of the present disclosure explicitly optimize a classification model for use in a particular regime (e.g., subject to a particular constraint), when the classification model used in that regime it will often significantly outperform a standard classification model with an adjusted threshold. Thus, the performance of the computing system itself is improved. For example, the malicious sites can be classified with improved recall.

Likewise, the improved performance of the classification model in a particular regime can result in improved goods, services, or system performance that result from or are based on the classification provided by the classification model in such regime. For example, since malicious sites are classified with improved recall, a computing system that relies upon the classifications of the model is less likely to visit such a malicious site and, therefore, is less likely to be infected with or acquire malware, thereby resulting in less system down-time and improved system processing performance.

As another example technical effect and benefit, because the systems and methods of the present disclosure can be used to transform a constrained optimization problem into an unconstrained optimization problem, optimization techniques designed for unconstrained problems (e.g., gradient-based techniques) can be used. These optimization techniques designed for unconstrained problems are typically much less complex and resource intensive than optimization techniques designed for constrained problems. Therefore, the systems and methods of the present disclosure enable classification models which satisfy constraints to be trained in a much less resource intensive fashion, thereby saving processing resources, memory resources, bandwidth (e.g., in the case of distributed training schemes), and/or other computing resources.

In the sections that follow, the present disclosure first shows that, using the insights of the present disclosure, a wide variety of machine learning problems with constraints can be recast as ordinary, unconstrained learning problems. Second, the present disclosure shows that the resulting unconstrained problems can be solved efficiently and generally; they are particularly amenable to gradient-based optimization, independent of what model is used. Next, a convex upper bound on the loss is derived and a uniform risk bound is proven for linear models. Finally, experimental results across a variety of benchmarks are provided which demonstrate performance matching or outperforming state of the art methods.

For simplicity of explanation, the present disclosure focuses on binary classification and applies the quantile estimation approach to optimize Precision at a fixed recall and Precision@K. However, the present disclosure is not limited to these example focuses. In particular, while the present disclosure presents examples for Precision at a fixed recall and Precision@K, aspects of the present disclosure such as, for example, the use of quantile function estimators to transform constrained machine learning problems into unconstrained problems, are more general and are applicable in scenarios other than the presented examples.

2. Example Devices and Systems

Figure 3A:
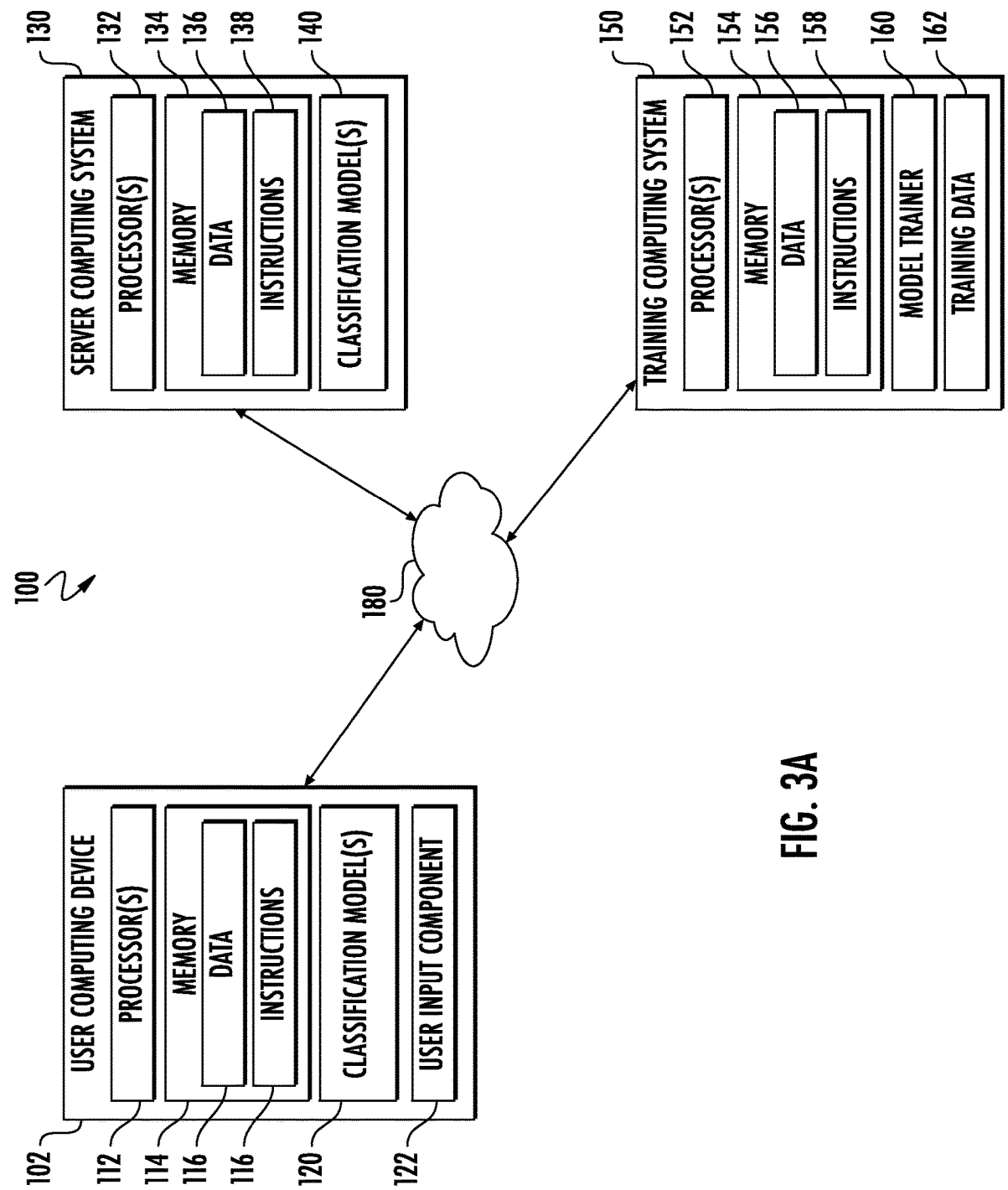
FIG. 3A depicts a block diagram of an example computing system according to example embodiments of the present disclosure.

FIG. 3A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more classification models 120. In some implementations, the classification model 120 can perform various types of classification based on input data. For example, the classification model 120 can perform binary classification or multiclass classification. In binary classification, the output data can include a classification of the input data into one of two different classes. In multiclass classification, the output data can include a classification of the input data into one (or more) of more than two classes. The classifications can be single label or multi-label.

In some implementations, the classification model 120 can perform discrete categorical classification in which the input data is simply classified into one or more classes or categories.

In some implementations, the classification model 120 can perform classification in which the classification model 120 provides, for each of one or more classes, a numerical value descriptive of a degree to which it is believed that the input data should be classified into the corresponding class. In some instances, the numerical values provided by the classification model 120 can be referred to as "confidence scores" that are indicative of a respective confidence associated with classification of the input into the respective class. In some implementations, the confidence scores can be compared to one or more decision thresholds to render a discrete categorical prediction. In some implementations, only a certain number of classes (e.g., one) with the relatively largest confidence scores can be selected to render a discrete categorical prediction.

In some implementations, the classification model 120 can provide a probabilistic classification. For example, the classification model 120 can be able to predict, given a sample input, a probability distribution over a set of classes. Thus, rather than outputting only the most likely class to which the sample input should belong, the classification model 120 can output, for each class, a probability that the sample input belongs to such class. In some implementations, the probability distribution over all possible classes can sum to one. In some implementations, a softmax function or layer can be used to squash a set of real values respectively associated with the possible classes to a set of real values in the range (0, 1) that sum to one.

In some implementations, the probabilities provided by the probability distribution can be compared to one or more decision thresholds to render a discrete categorical prediction. In some implementations, only a certain number of classes (e.g., one) with the relatively largest predicted probability can be selected to render a discrete categorical prediction.

The classification models 120 can be or can otherwise include various machine-learned models such as, for example, neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the classification model 120 can be or include linear classification models, quadratic classification models, or the like. In some implementations, the classification model 120 can be or include one or more decision tree-based models such as, for example, classification and/or regression trees; iterative dichotomiser 3 decision trees; C4.5 decision trees; chi-squared automatic interaction detection decision trees; decision stumps; conditional decision trees; etc. In some implementations, the classification model 120 can be or include one or more kernel machines. In some implementations, the classification model 120 can be or include one or more support vector machines.

In some implementations, the classification model 120 can be or include one or more Bayesian models such as, for example, naïve Bayes models; Gaussian naïve Bayes models; multinomial naïve Bayes models; averaged one-dependence estimators; Bayesian networks; Bayesian belief networks; hidden Markov models; etc.

In some implementations, the one or more classification models 120 can be received from the server computing system 130 over network 180, stored in the user computing device memory 114, and then used or otherwise implemented by the one or more processors 112. In some implementations, the user computing device 102 can implement multiple parallel instances of a single classification model 120.

Additionally or alternatively, one or more classification models 140 can be included in or otherwise stored and implemented by the server computing system 130 that communicates with the user computing device 102 according to a client-server relationship. For example, the classification models 140 can be implemented by the server computing system 140 as a portion of a web service (e.g., an anti-abuse service, an image classification service, an image labelling service, and/or the like). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned classification models 140. For example, the models 140 can be or can otherwise include various machine-learned models. The models 140 can be the same as any of the models 120 described above.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained. The model trainer 160 can use any of the training techniques described herein, including, for example, quantile estimation approaches.

In particular, the model trainer 160 can train the classification models 120 and/or 140 based on a set of training data 162. The training data 162 can include, for example, training examples that have been annotated with a corresponding label (e.g., a "correct" classification).

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 3A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 3B:
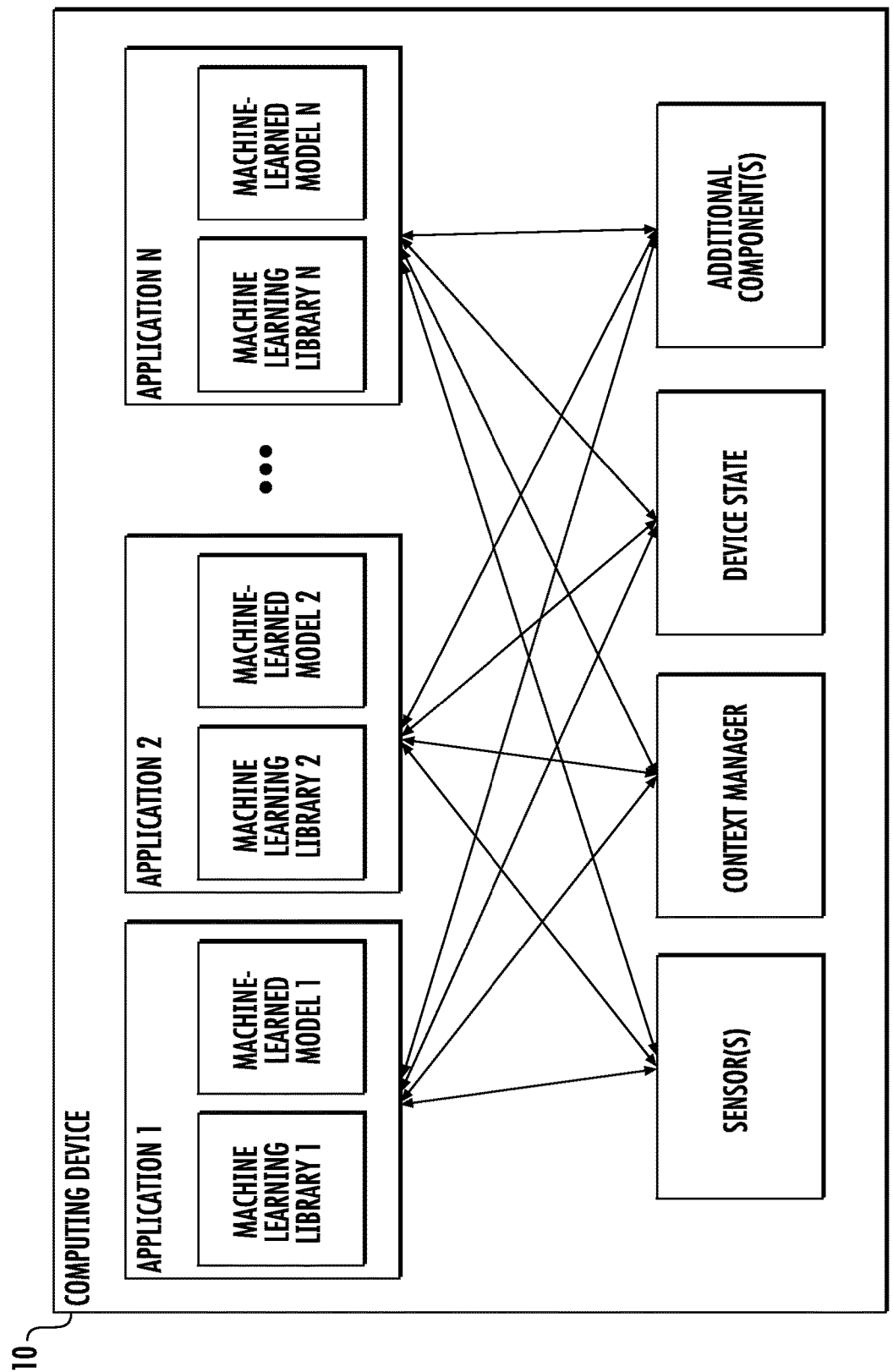
FIG. 3B depicts a block diagram of an example computing device according to example embodiments of the present disclosure.

FIG. 3B depicts a block diagram of an example computing device 10 according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a classification model. Example applications include a text messaging application, an email application, a dictation application, a virtual keyboard application, a browser application, etc.

As illustrated in FIG. 3B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 3C:
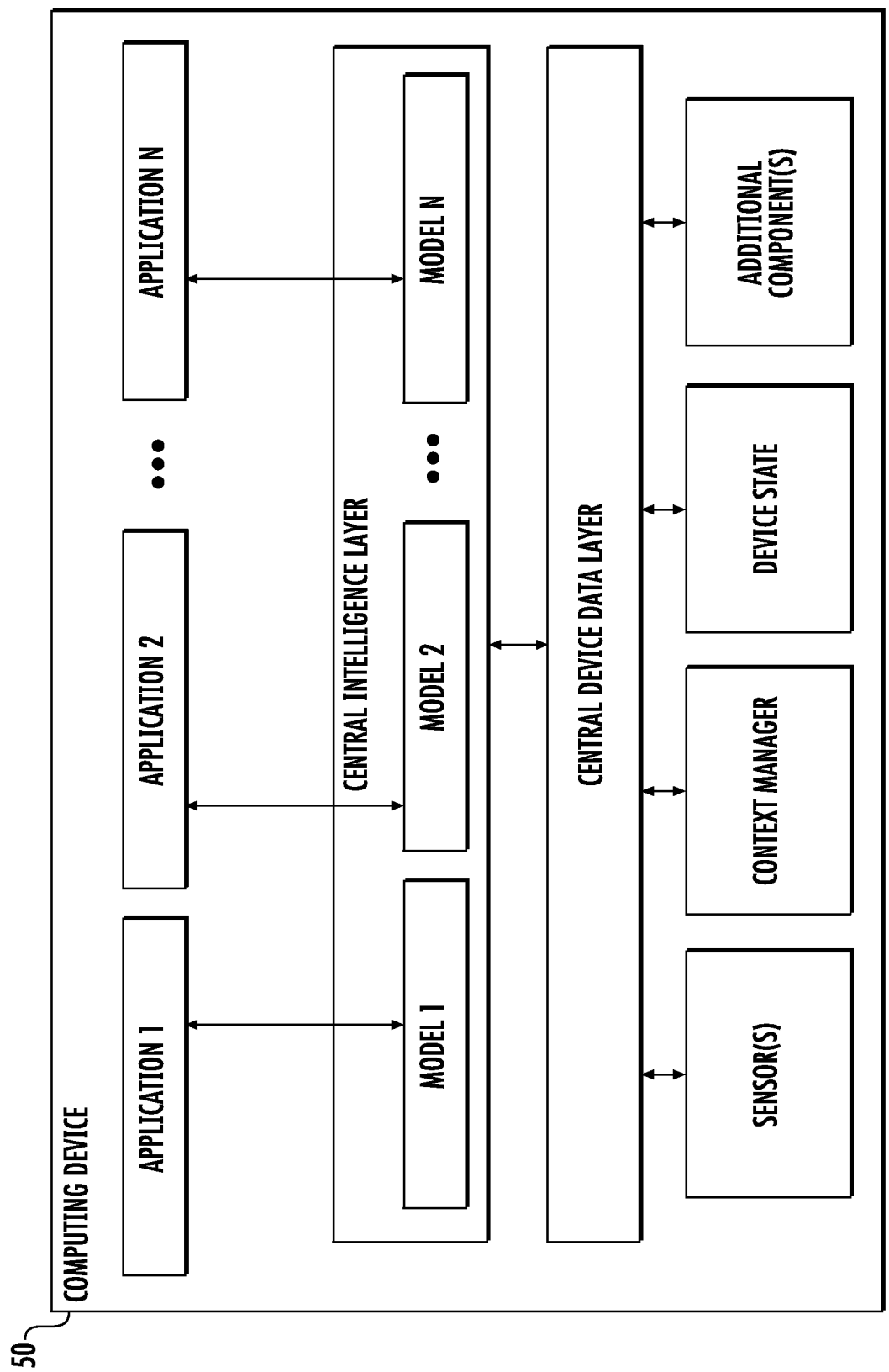
FIG. 3C depicts a block diagram of an example computing device according to example embodiments of the present disclosure.

FIG. 3C depicts a block diagram of an example computing device 50 according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 3C, a respective machine-learned model (e.g., a classification model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 3C, the central device data layer can communicate with a number of other components of the computing device, such as, for example, one or more sensors, a context manager, a device state component, and/or additional components. In some implementations, the central device data layer can communicate with each device component using an API (e.g., a private API).

3. Example Quantile Surrogate Losses

This section describes example approaches provided by the present disclosure in detail and focus on maximizing Precision@K and Precision at a fixed recall. Let $X=\{x_1, \ldots, x_n\}$ consist of the features in a training dataset, and let $Y=\{y_1, \ldots, y_n\}$ denote the corresponding labels in $\{-1,1\}$.

An example classification model can include learnable parameters w, and a decision threshold θ. In some implementations, given an input $x_i$, the classification model can generate a score for the input and classify the input based on the generated score. In some implementations, the portion of the classification model that generates the score can be referred to as a scoring model f, while the score generated by the scoring model for the input $x_i$ is represented as $f(x_i; w)$. In some implementations, the ultimate output or prediction $\hat{y}_i$ of the classification model on the ith example is made according to:

$$\hat{y}_i = \text{sign}(f(x_i; w) - \theta).$$

Definition 3.1 Given a subset $A \subseteq X$, the predicted positive rate for a classification model (f,θ) on A is defined as the fraction of examples in A predicted to be positives:

$$r_A(f, \theta) = \frac{|\{x_i \in A: f(x_i; w) - \theta > 0\}|}{|A|}.$$

A rate constraint is a constraint which can be written in the form $r_A \gtreqless c$ for some value of $c \in [0,1]$. The value c can be referred to as a rate value.

Note that $r_A(f,\theta)$ is piecewise constant, discontinuous, and monotone decreasing in θ. Defining $f(A)=\{f(x): x \in A\}$, it can be seen that $r_A(f, \min f(A))=1$ and $r_A(f, \max f(A))=0$. Therefore, inequality rate constraints can always be satisfied by setting θ to some value depending on f and c.

The notion of predicted positive rate on a subset is general enough to represent many metrics of interest. Letting $X^+$ denote the positive examples in X, it can be seen that the recall (or true positive rate) of a classification model (f,θ) is equal to $r_{X^+}(f,\theta)$. The typical notion of predicted positive rate coincides with $r_X(f,\theta)$, and false positive rate can be written as $r_{X^-}(f,\theta)$. Other examples include coverage, churn, and fairness, which can all be expressed in terms of predicted positive rates. Because the predicted positive and predicted negative rates must sum to one, predicted positive rate constraints are specifically discussed herein without loss of generality to these other example metrics of interest.

Given some metric (or utility) G that depends on the data X, Y and the classification model (f,θ), the problem of maximizing G subject to the rate constraint $r_A(f,\theta) \geq c$ can be defined as:

$$\max_{f,\theta} G(X, Y, f, \theta) \text{ subject to } r_A(f, \theta) \geq c. \quad (1)$$

Note that G need not decompose across examples, as accuracy does. Due to the discontinuity of $r_A(f,\theta)$ and most metrics G, the problem is combinatorial and intractable to solve exactly.

However, according to an aspect of the present disclosure, there are many cases in which an optimizer (f*, θ*) can be characterized in terms of the quantiles of f*(A).

Definition 3.2 For a set of real numbers $S=\{s_1, \ldots, s_N\}$ the quantile function is defined as:

$$q(S, c) = \sup\{t: |\{s_i \leq t\}|/N \leq c\}$$

$$= \inf\{t: |\{s_i \leq t\}|/N \geq c\}.$$

Proposition 1 Suppose (f,θ) is a feasible point for (1) and let $$\hat{\theta} = q(f(A), 1-c).$$

Then $(f,\hat{\theta})$ is also feasible. If G (X,Y,f,θ) is monotone increasing in θ over the range $[\theta, \hat{\theta}]$, then G $(X,Y,f,\hat{\theta}) \geq (X, Y,f,\theta)$.

Proof. Because $r_A(f,\theta)$ is monotone decreasing in θ, any admissible θ must satisfy $$\theta \leq \sup\{t: r_A(f^*, t) \geq c\} \leq \sup\{t: |\{x \in A: f^*(x) > t\}|/|A| \geq c\} \leq \sup\{t: 1 - |\{x \in A: f^*(x) \leq t\}|/|A| \geq c\} = \sup\{t: |\{x \in A: f^*(x) \leq t\}|/|A| \leq 1-c\}.$$

The supremum in the last line is exactly the quantile function, and so $$\theta \leq q(f(A), 1-c).$$

The claim follows from the fact that G is monotone in θ and that $\hat{\theta} \geq \theta$. End proof.

Applying the proposition to an optimizer (f*,θ*) shows that $(f^*, \hat{\theta})$ is also an optimizer. In particular, a scoring model f which optimizes (1) is a minimizer of the loss:

$$\min_f L(X, Y, f, q(f(A), 1-c)) \quad (2)$$

with L=−G. Conversely, optimizers of (2) are feasible and hence optimal for (1). In practice, G is usually a differentiable surrogate allowing for numerical optimization and the monotonicity assumption is easily verified. For inequality constraints of the form $r_A(f,\theta) \leq c, \theta^*$ is again given by the quantile function so long as G is monotone decreasing in $\theta$.

Proceeding farther depends on the choice of G and the specific rate constraint, so the present disclosure next discusses the task of maximizing precision subject to recall and predicted positive rate constraints. Afterward, estimation of the quantile function $q(f(A),c)$ is discussed.

3.1 Precision at a Fixed Recall

The precision and recall of a classification model (f,θ) are respectively defined as:

$$P(f, \theta) = \frac{TP(f, \theta)}{TP(f, \theta) + FP(f, \theta)}$$

$$R(f, \theta) = \frac{TP(f, \theta)}{TP(f, \theta) + FN(f, \theta)} = \frac{TP(f, \theta)}{|X^+|},$$

where TP and FP denote the true positives and false positives, respectively:

$$TP(f, \theta) = \sum_{i: y_i=1} 1_{f(x_i;w) > \theta}$$

$$FP(f, \theta) = \sum_{i: y_i=-1} 1_{f(x_i;w) > \theta}.$$

Thus, to optimize for the Precision@Recall objective (P@R), one wishes to solve:

$$\max_{f,\theta} \frac{TP(f, \theta)}{TP(f, \theta) + FP(f, \theta)} \quad (3)$$

subject to $r_{X^+}(f, \theta) \geq c$.

It is known that the recall constraint $r_{X^+} \geq c$ will be active, because precision is trivially maximized by predicting few or no positives. This implies $r_{X^+} = \bar{c}$, where $\bar{c} = \min\{k/|X^+| : k/|X^+| \geq c\}$. Because $N^+ = |X^+|$ is fixed, it can be concluded that $TP(f,\theta) = \bar{c}N^+$. Substituting this value for TP into the expression for precision gives $$P(f, \theta) = \frac{TP(f, \theta)}{TP(f, \theta) + FP(f, \theta)} = \frac{\bar{c}N^+}{\bar{c}N^+ + FP(f, \theta)}.$$

Thus, solving:

$$\max_{f,\theta} \frac{\bar{c}N^+}{\bar{c}N^+ + FP(f, \theta)} \quad (4)$$

subject to $r_{X^+}(f, \theta) \geq c$ gives the solution to (3). In addition, (4) is equivalent to:

$$\min_{f,\theta} FP(f, \theta) \text{ subject to } r_{X^+}(f, \theta) \geq c. \quad (5)$$

With the objective in this form, FP(f,θ) can be upper bounded in the standard way by the logistic loss (or hinge loss), which is denoted by l:

$$FP(f, \theta) = \sum_{i: y_i=-1} 1_{f(x_i;w) - \theta > 0} \leq \sum_{i: y_i=-1} l(f(x_i; w) - \theta).$$

This leaves:

$$\min_{f,\theta} \sum_{i: y_i=-1} l(f(x_i; w) - \theta) \quad (6)$$

subject to $r_{X^+}(f, \theta) \geq c$.

Because the loss is monotone decreasing in θ, the monotonicity assumption of Proposition 1 is met and so $\theta = q(f(X^+), 1-c)$. This leads to the unconstrained objective for P@R:

$$\min_{f} \sum_{i: y_i=-1} l(f(x_i; w) - q(f(X^+), 1 - c)). \quad (7)$$

In practice, the minimization is performed with respect to the parameters w of the scoring model f, e.g. by stochastic gradient descent.

The precision at recall objective can be used to target Precision-Recall AUC by approximating the area under the Precision-Recall curve as a Riemann sum.

3.2 Precision at a Fixed Predicted Positive Rate

For a training dataset X with N points, the Precision@K metric is equivalent to precision at a predicted positive rate of K/N. Therefore, the objective can be considered as:

$$\max_{f,\theta} P(f, \theta) \text{ subject to } r_X(f, \theta) = c. \quad (8)$$

Because TP+FP is equal to the number of predicted positives, the constraint $r_X(f,\theta)=c$ implies that TP+FP=cN, and so (8) is equivalent to:

$$\max_{f,\theta} TP(f, \theta) \text{ subject to } r_X(f, \theta) = c.$$

Using TP=cN−FP, the objective can be rewritten as:

$$\min_{f,\theta} FP(f, \theta) \text{ subject to } r_X(f, \theta) = c,$$

which by the same logistic loss bound and application of Proposition 1 becomes:

$$\min_{f} \sum_{i: y_i=-1} l(f(x_i; w) - q(f(X), 1 - c)). \quad (9)$$

Alternatively, because the loss on the positive examples can be used as a lower bound on the true positive rate, the objective can also be formed as:

$$\min_f \sum_{i: y_i=1} l(-f(x_i; w) + q(f(X), 1-c)). \quad (10)$$

4. Example Estimators of the Quantile Function

Even with the unconstrained losses (7) and (9) in hand, the question remains of how to estimate the quantile function:

$$q(f(A), c).$$

The chosen estimator is required to have explicit dependence on w, for the purposes of numerical optimization.

The simplest choice is to apply the definition of q directly, which results in the point estimator:

$$\hat{q}_1(f(A), c) = f(\hat{x})$$

where $\hat{x}$ is the datapoint which solves:

$$\hat{x} = \arg\max_{x \in A} \left\{ f(x) : \frac{|\{z \in A : f(z) \leq f(x)\}|}{|A|} \leq c \right\}.$$

In other words, take the scores $f(A) = \{f_1, \ldots, f_n\}$ sorted in ascending order and use $\hat{q}_1 = f_k$ for the largest integer k such that $k/n \leq c$.

One possible drawback associated with $\hat{q}_1$ is that, in some instances, the variance of this estimator and its gradient may be problematically large. For example, consider the case when the scoring model f is linear:

$$f(x; w) = w^T x,$$

where a bias term is unnecessary because it can be absorbed in to θ. In this case, the loss for a rate constraint $r_A(f, \theta) \geq c$ is $$L = \sum_i l(f(x_i; w) - \hat{q}_1(f(A))) \quad (11)$$
$$= \sum_i l(w^T x_i - w^T \hat{x}),$$

where $\hat{x} \in A$ is the datapoint such that $\hat{q}_1(A), c) = f(\hat{x}) = w^T \hat{x}$. Note that, due to the change in $\hat{x} = \hat{x}(w)$ as w changes, the loss is not convex.

Letting σ(x), the logistic sigmoid, denote the derivative of logloss, the gradient of L (where it is defined) is:

$$\nabla_w L = \sum_i \sigma(w^T x_i - w^T \hat{x})(x_i - \hat{x}) \quad (12)$$
$$= \sum_i a_i x_i - \left(\sum_i a_i\right) \hat{x}$$

where $a_i = \sigma(w^T x_i - w^T \hat{x})$. From this expression, the excessive influence of $\hat{x}$ is clear. Variation in the classification model parameters or the data which causes only a small change in the quantile estimate may nonetheless cause a dramatic change in $\nabla_w L$; this gradient is discontinuous.

In Boyd et al. (Accuracy at the Top. In *Advances in neural information processing systems*, pp. 953-961, 2012) (hereinafter "Accuracy at the Top"), an objective similar to (9) is considered in the presence of rate constraints. There, (11) is minimized separately for each possible choice $\hat{x} \in X$ to yield a solution $w_k$ for each $k=1, \ldots, |X|$. Of these $|X|$ solutions, the algorithm selects the one with the smallest value of $|r_A(f(\cdot; w_k), \theta) - c|$. While this approach elegantly handles the nondifferentiability and nonconvexity of L, it is unfortunately not feasible even for datasets of moderate size.

One alternative for estimating q(f(A),c) would be to assume a flexible parametric form for the distribution of the scores f(A), for which the quantile function is available in closed form (e.g., as a function of the maximum likelihood parameter estimates). While this approach might suffice for simple classification models, its utility is dubious in the context of complex classification models such as neural networks.

4.1 Kernel Quantile Estimators

According to another aspect of the present disclosure, to achieve lower gradient variance than the point estimator without relying on parametric assumptions, the present disclosure proposes use of kernel quantile estimators. These are a subclass of L-estimators, computed as a weighted average of the order statistics of f(A). These estimators are beneficial for the techniques described herein because their gradients are far less sensitive to small parameter changes than the point estimator.

Definition 4.1 Let $S = \{s_1, \ldots s_N\}$ be a set of real numbers, and let $s_{(i)}$ denote the ith order statistic of S (i.e., $s_{(i)} = s_{\sigma(i)}$ where σ is the permutation which sorts S in ascending order). Given a symmetric, normalized kernel φ and a nonnegative scale parameter h, the kernel quantile estimator corresponding to φ and h is defined as:

$$\hat{q}_\phi^h(S, c) = \frac{1}{N} \sum_{i=1}^{N} \phi_h(i^*/N - c) s_{(i)}, \quad (13)$$

where $$\phi_h(x) = \frac{1}{h} \phi(x/h),$$

c is the quantile to be estimated, and the index i* is defined to break ties: $i^* = \max\{j : s_{(j)} = s_{(i)}\}$.

The free parameter h controls the scale of the kernel, and increasing it trades off variance for bias.

There are many other L-estimators of the quantile function; see for example the following and citations therein: Cheng, The Bernstein Polynomial Estimator of a Smooth Quantile Function. *Statistics &probability letters*, 24(4): 321-330, 1995; Harrell and Davis, A New Distribution-free Quantile Estimator. *Biometrika*, 69(3):635-340, 1982; Kalgh and Lachenbruch, A Generalized Quantile Estimator. *Communications in Statistics—Theory and Methods*, 11(19): 2217-2238, 1982; Pepelyshev et al., Estimation of the Quantile Function using Bernstein-Durrmeyer Polynomials. *Journal of Nonparametric Statistics*, 26(1):1-20, 2014; and Zielinski, *Optimal Quantile Estimators: Small Sample Approach*. Polish Academy of Sciences. Institute of Mathematics, 2004. Each of these L-estimators can be used with varying benefits.

However, in all of the experiments described herein, the Gaussian kernel estimator was used:

$$\phi_h(x) = \frac{1}{h\sqrt{2\pi}} e^{x^2/2h^2}.$$

Like the point quantile estimator, the kernel estimators lead to losses which are not convex.

Another example L-estimator of the present disclosure serves as a lower bound for the point estimator and results in convex loss. Let $$\hat{q}_m(S, c) = \text{mean}_{x \in S}\left\{x : \frac{|\{z \in S : z \leq x\}|}{|S|} \leq c\right\}. \quad (14)$$

From the definition of the point estimator, it is immediate that $q_1 \geq q_m$ as the max is greater than the mean. In other words: rather than taking the kth largest score, where k is the largest integer k such that $k/N \leq c$, instead take the mean of the bottom k scores, which serves as a lower bound. In the case when f is linear, this lower bound is concave because it is a pointwise minimum of affine functions.

Returning to the case of a rate-constrained precision loss (of which (7) and (9) are special cases), it can be seen that because $\hat{q}_m \leq \hat{q}_1$ and log loss is non-decreasing, $$\sum_i l(f(x_i; w) - \hat{q}_1(f(A), c)) \leq \sum_i l(f(x_i; w) - \hat{q}_m(f(A), c)) \quad (15)$$

so that using the $\hat{q}_m$ estimator yields an upper bound on the loss with the point estimator $\hat{q}_1$. When f is linear, repeated applications of the rules of convex function composition show that $\hat{q}_m(f(A),c)$ is convex and hence the entire upper bound is as well. The bound $\hat{q}_m$ enjoys a lower gradient variance than $\hat{q}_1$, and is tightest when c is small, which occurs exactly when enforcing a constraint that the predicted positive rate on A be high.

4.2 Stochastic Gradient Descent with Quantile Estimators

Losses of the form (2), regardless of the choice of quantile estimator or bound, are compatible with any classification model and amenable to numerical optimization. One example of a possible application to stochastic gradient descent (SGD) is provided in Algorithm 1. Other and different applications to SGD and/or other optimization techniques are possible as well.

ALGORITHM 1

SGD for Quantile Loss Eq. (2)

1: require A dataset (X, Y), desired rate constraint $r_A \geq c$ on a subset A $\subseteq$ X, quantile estimator $\hat{q}$, scoring model $f$ (•; w), and learning rate $\gamma$.
2: while not converged do
3:     Gather a minibatch $(X_b, Y_b)$ from (X, Y)
4:     Gather a minibatch $A_b$ from A
5:     Update $w \leftarrow w - \gamma \nabla_w L(X_b, Y_b, f(\cdot; w), \hat{q}(f(A_b), 1 - c))$
6: end while Step 4 is beneficial when datapoints from A are rare, but when A is common or minibatches are large it will suffice to take $A_b = X_b \cap A$.

5. Example Experiments

This section describes example experiments that were performed using example implementations of aspects of the present disclosure. The example implementations described in this section are provided as examples of how aspects of the present disclosure can be implemented. However, the present disclosure is not limited by or to the example implementations described in this section.

5.1 Precision@K

This section discusses the application of example implementations the quantile threshold framework to the target metric Precision@K. The quantile loss is compared with two state of the art algorithms: Accuracy at the Top and the average surrogate loss $I_{prec@k}^{avg}$ from Kar et al. Surrogate functions for maximizing precision at the top. In *International Conference on Machine Learning*, pp. 189-198, 2015 (hereinafter Kar et al.).

To target Precision@K, example implementations of the present disclosure optimize for Precision at a predicted positive rate i=K/N, where N is the number of datapoints. In all experiments, the Gaussian kernel quantile estimator was used.

5.1.1 Ionosphere and Housing Datasets

The results from Accuracy at the Top are compared to those obtained using the quantile loss surrogate, averaged across 100 random train/test splits of the data. The fraction of data used for training is 30% for Ionosphere and 66% for Housing; the rest is held out for testing. Tables 1 and 2 below show the Precision@$\tau$ of the methods, where $\tau$ is the classification model's predicted positive rate. The models trained with the quantile loss surrogate were evaluated at the same value of $\tau$ for which they were trained, and were optimized using gradient descent with momentum on the objective (9) with weight decay.

The weight decay regularization coefficient and scale parameter h of the kernel quantile estimator are the algorithm's only hyperparameters in the example implementations. For a fair comparison against Accuracy at the Top, which has only one hyperparameter (the regularization coefficient), h is fixed to equal 0.05 on the Ionosphere data and h is fixed to equal 0.08 on the Housing data. As in Accuracy at the Top, for each value of $\tau$ the regularization coefficient C was chosen based on the largest average value of Precision@$\tau$.

Because the quantile surrogate loss is nonconvex, the quantile method may converge to a suboptimal local minimum. To mitigate this problem, the algorithm can be run with multiple random initializations of w and the solution with the lowest loss on the training set can be taken. Results for one and three initializations are reported.

The quantile surrogate achieves results matching or beating Accuracy at the Top, with the largest improvements occurring for small $\tau$. In addition, optimization of the quantile surrogate enjoys very favorable computational complexity relative to Accuracy at the Top. Assuming the same number of iterations across all algorithms, logistic regression has an O(N) cost. Accuracy at the Top requires solving a separate logistic regression problem for each datapoint, for a total cost of $O(N^2)$. On the other hand, the only additional cost of the quantile method over logistic regression is a sorting operation per iteration, for a total cost of O(N log N).

TABLE 1

P@τ on the Ionosphere dataset, τ ∈ [0, 1] is the predicted positive rate. Results are expressed as mean ± standard deviation. The columns correspond to logistic regression, Accuracy at the Top, the quantile method with one initialization, and the quantile method with three initializations, respectively.

| τ (%) | LR | AATP | Q1 | Q3 |
|---|---|---|---|---|
| 1 | 0.52 ± 0.38 | 0.85 ± 0.24 | 0.87 ± 0.27 | 0.98 ± 0.10 |
| 5 | 0.76 ± 0.14 | 0.91 ± 0.14 | 0.93 ± 0.11 | 0.98 ± 0.07 |
| 9.5 | 0.83 ± 0.08 | 0.93 ± 0.06 | 0.91 ± 0.10 | 0.96 ± 0.08 |
| 14 | 0.87 ± 0.05 | 0.91 ± 0.05 | 0.90 ± 0.08 | 0.92 ± 0.08 |
| 19 | 0.89 ± 0.04 | 0.89 ± 0.04 | 0.88 ± 0.06 | 0.88 ± 0.05 |

TABLE 2

P@τ on the Housing dataset. τ ∈ [0, 1] is the predicted positive rate. The columns correspond to logistic regression, Accuracy at the Top, the quantile method with one initialization, and the quantile method with three initializations, respectively.

| τ (%) | LR | AATP | Q1 | Q3 |
|---|---|---|---|---|
| 1 | 0.26 ± 0.44 | 0.2 ± 0.27 | 0.4 ± 0.49 | 0.43 ± 0.50 |
| 2 | 0.12 ± 0.19 | 0.23 ± 0.10 | 0.23 ± 0.23 | 0.28 ± 0.23 |
| 3 | 0.09 ± 0.10 | 0.20 ± 0.12 | 0.18 ± 0.17 | 0.25 ± 0.16 |
| 4 | 0.09 ± 0.10 | 0.19 ± 0.13 | 0.16 ± 0.14 | 0.23 ± 0.14 |
| 5 | 0.11 ± 0.09 | 0.17 ± 0.07 | 0.14 ± 0.12 | 0.21 ± 0.13 |
| 6 | 0.11 ± 0.08 | 0.14 ± 0.05 | 0.13 ± 0.12 | 0.18 ± 0.10 |

5.1.2 KDD Cup 2008

SVMPerf (see Joachims, Thorsten. A support vector method for multivariate performance measures. In *Proceedings of the 22nd international conference on Machine learning*, pp. 377-384. ACM, 2005) is a standard baseline for methods targeting Precision@K. It is compared to the $I_{prec@k}^{avg}$ surrogate from Kar et al., which resolves theoretical issues which arise when applying the structured SVM method to Precision@K. Results are presented in terms of Precision@τ. For this dataset, the loss (10) was considered.

Figure 4:
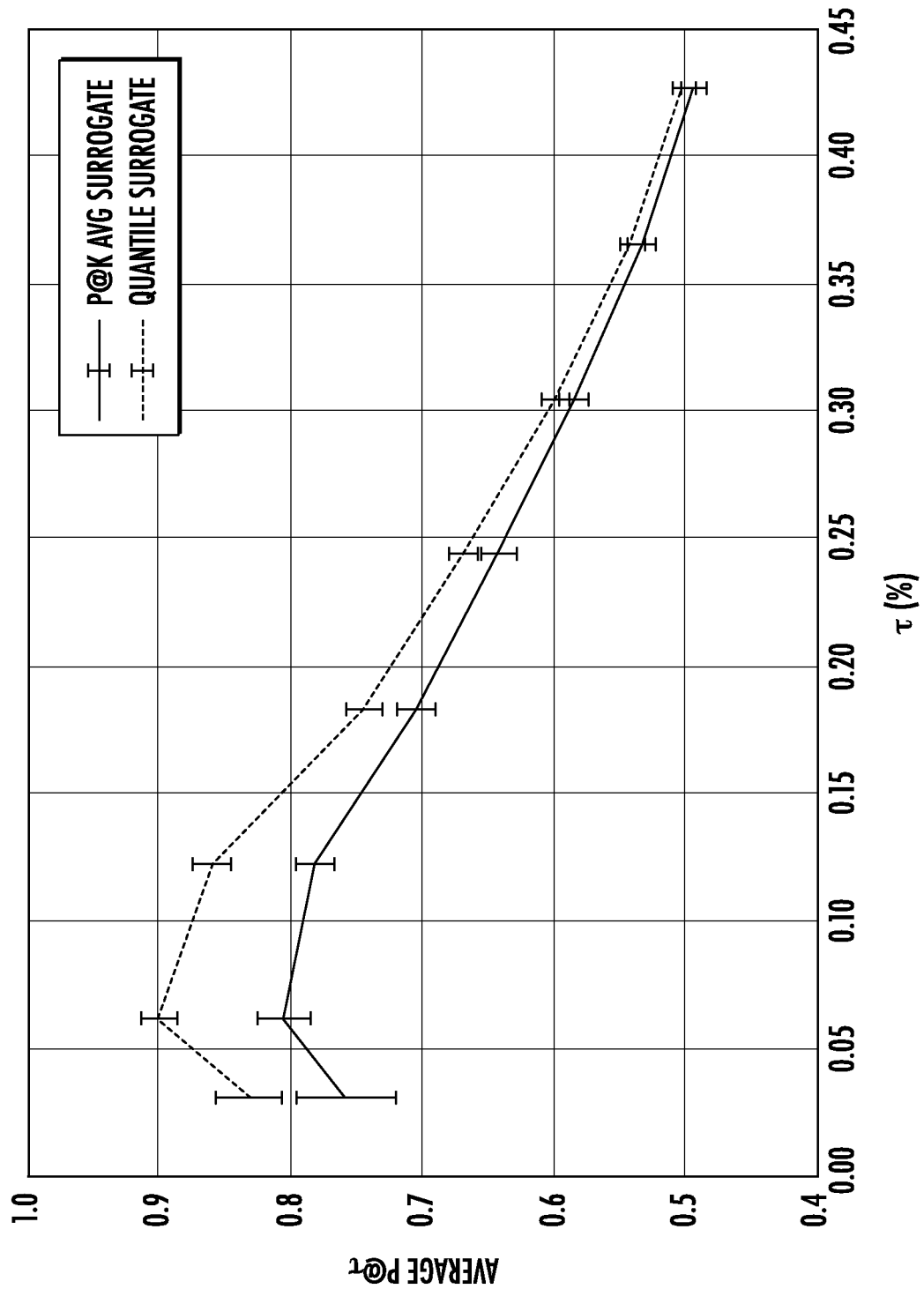
FIG. 4 depicts a graphical diagram of example experimental results according to example embodiments of the present disclosure.

FIG. 4 illustrates P@τ on the KDD Cup 2008 dataset, where error bars denote 95% confidence intervals. In particular, FIG. 4 shows results averaged across 100 random train/test splits of the dataset, with 70% used for training and the rest reserved for testing. Models with the $I_{prec@k}^{avg}$ and quantile surrogate losses were evaluated at the same value of τ for which they were trained, and were learned on the full training set to give the strongest results. The model with the quantile surrogate was trained using stochastic gradient descent with momentum on minibatches of size 1000 for 3 epochs, with randomly initialized parameters.

5.2 Precision at a Fixed Recall

This section evaluates example implementations of the quantile framework on the target metric of precision at fixed recall for a range of recall values on a variety of datasets.

5.2.1 Synthetic Dataset

Figure 5:
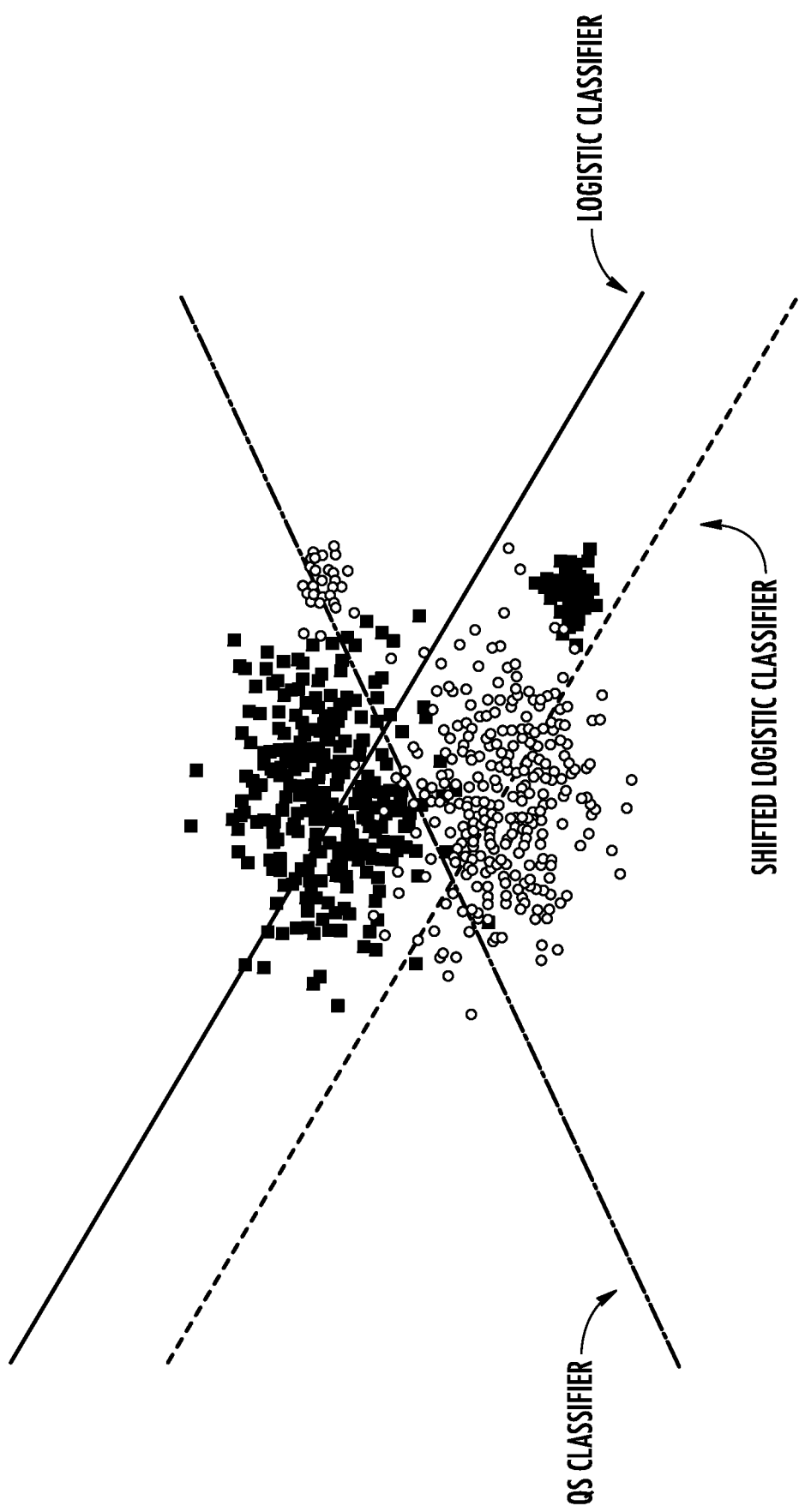
FIG. 5 depicts a graphical diagram of example experimental results according to example embodiments of the present disclosure.

To illustrate the benefits of minimizing the precision at recall quantile loss (7) rather than maximizing likelihood and adjusting the decision threshold, consider the synthetic dataset in FIG. 5.

The data consists of a mixture of isotropic Gaussians with a prior of p(y=1)=0.1, and the objective is to maximize precision at a recall of 0.95. The experiment included initializing the weights of a linear classification model randomly, and minimizing (7) using the Gaussian kernel quantile estimator with h=0.05. For this simple problem, initializations that led to different results were not found.

In particular, FIG. 5 illustrates logistic (black) and quantile surrogate loss (magenta) classification models on the synthetic dataset. The solid black line depicts the learned threshold of the logistic classification model, while the dashed black line is the adjusted threshold to satisfy a 90% recall constraint. The precision of the logistic classification model at recall 0.9 is 0.13, the QS loss classification models achieves a precision of 0.37.

Adjusting the threshold learned by logistic regression to satisfy the recall constraint results in a classification model which misclassifies most negatives. In contrast, the linear classification model trained using the precision at recall loss performs nearly as well as possible. Threshold adjustment performs poorly in this case because the logistic regression classification model is poorly calibrated; the conditional class probability p(y=1|x) is inaccurate.

6. Generalization Bounds

Consider the following L-estimator which the present disclosure refers to as the interval quantile estimator:

$$\hat{q}_I(S, c) = \left| \frac{1}{\lfloor N(k_2 - k_1) \rfloor} \sum_{i=\lfloor Nk_1 \rfloor}^{\lfloor Nk_2 \rfloor} s_{(i)} \right|, \quad (16)$$

where $0 < k_1 < c < k_2$, and $0 \leq s_1, \ldots, \leq s_N$. This is a generalized version of the upper bound estimator in Eq. (14), since instead of taking all scores lower than the quantile, the average on an arbitrary interval is taken.

A generalization bound for the quantile loss function has been proven where the quantile estimator is either the interval estimator or a kernel quantile estimator (Eq. (13)) where $\phi_h$ is bounded and Lipschitz. Moreover, the bound is uniform with respect to model parameters if the model is linear. The conclusion holds for quantile estimators on an arbitrary subset of the feature set X, and in particular includes the P@R and P@k case used in the experiments. The proof is similar to that in Kar et al., and follows mainly from repeated applications of Hoeffding's inequality (which also holds in the case of sampling without replacement (see Bardenet et al. Concentration inequalities for sampling without replacement. Bernoulli, 21(3):1361-1385, 2015)).

Proposition 2 (Uniform Convergence) Let $Z = \{(x_1, y_1), \ldots, (x_N, y_N)\}$ be a set of feature-label pairs, $\hat{Z}$ be a sample of b elements chosen from Z (either i.i.d or without replacement), Let A be some subset of Z, $\hat{A} = A \cap \hat{Z}$, and $f(x) = w^T x$ be a linear model with parameters w satisfying $\|w\| \leq C$. Let $\hat{q}(f(A))$, $\hat{q}(f(\hat{A}))$ be either the kernel estimator (13) with $\phi$ bounded and Lipschitz, or the interval estimator (16). Define $L(w;Z,A) = \Sigma_i (1-y_i) l(f(x_i) - \hat{q}(f(A)))$. Then with probability at least 1−δ, $$|L_q(w; Z, A) - L_q(w; \hat{Z}, \hat{A})| = O\left(\sqrt{\frac{1}{b} \log \frac{1}{\delta}}\right) \quad (17)$$

uniformly in w.

Proposition 2 gives a uniform bound on the population loss based on the sample loss. However, because the quantile surrogate does not decompose across datapoints, minibatches give biased estimates and the efficacy of stochastic gradient methods is not immediately clear. In the case when q is the lower bound quantile estimator defined in Eq. (14), we have the following convergence bound for stochastic gradient descent on the quantile surrogate loss.

Proposition 3 Let w* be the parameters of a linear model learned by T steps of stochastic gradient descent with batch size b on the quantile loss $L_q$, where q is the lower bound estimator defined in Eq. (14). Then for any parameters w, with probability at least $1-\delta$ $$L_q(w^*; Z) \leq L_q(w; Z) + O\left(\sqrt{\frac{1}{b}\log\frac{1}{\delta}}\right) + O\left(\sqrt{\frac{1}{T}}\right). \quad (18)$$

The proof of Proposition 2 depends on the following concentration bounds for the kernel and interval quantile estimators.

Lemma 1 Let $F=\{f_1, \ldots, f_N\}$ be real numbers sorted in ascending order, and $|f_i| \leq 1$. Let $\hat{F}=\{\hat{f}_1, \ldots, \hat{f}_b\}$ be a sample (either i.i.d or without replacement) from the set F, also sorted in ascending order. Let $\hat{q}^h(F,c)$, $\hat{q}^h(\hat{F},c)$ be the kernel quantile estimator defined in Eq.(13), and assume the kernel function $\phi_h$ is bounded and Lipschitz continuous, then the following holds $$\left|\hat{q}^h(F, c) - \hat{q}^h(\hat{F}, c)\right| = O\left(\sqrt{\frac{1}{b}\log\frac{1}{\delta}}\right) \quad (19)$$

with probability at least $1-\delta$.

Lemma 2 Let $F=\{f_1, \ldots, f_N\}$ be real numbers sorted in ascending order, and $|f_i| \leq 1$. Let $\{\hat{f}_1, \ldots, \hat{f}_b\}$ be a sample (either i.i.d or without replacement) from the set F, also sorted in ascending order. Let $0 < k_1 < k_2 < 1$. Then the following holds with probability at least $1-\delta$:

$$\left|\frac{1}{*N(k_2-k_1)}\sum_{i=*Nk_1}^{*Nk_2} f_i - \frac{1}{*b(k_2-k_1)}\sum_{j=*bk_1}^{*bk_2} \hat{f}_j\right| = O\left(\sqrt{\frac{1}{b}\log\frac{1}{\delta}}\right). \quad (20)$$

7. Example Methods

Figure 6:
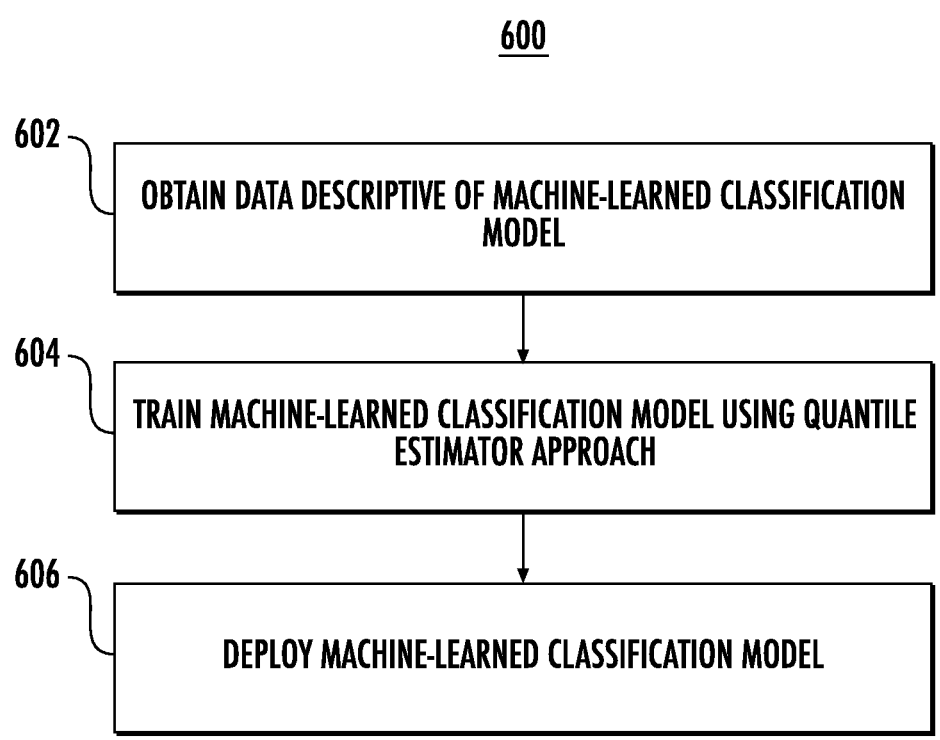
FIG. 6 depicts a flow chart diagram of an example method to train and deploy a machine-learned classification model according to example embodiments of the present disclosure.

FIG. 6 depicts a flow chart diagram of an example method 600 to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system obtains data descriptive of a machine-learned classification model. For example, the machine-learned classification model can be configured to produce a classification score for an input and to classify the input by comparing the classification score to a decision threshold.

At 604, the computing system can train the machine-learned model based at least in part on a training data. In particular, training the machine-learned model at 604 can include optimizing an unconstrained objective function in which the decision threshold of the machine-learned classification model is expressed as an estimator of a quantile function on the classification scores of the machine-learned classification model for a subset of the training dataset at a desired quantile.

In some implementations, the desired quantile is based at least in part on a rate value associated with the constraint. As one example, the desired quantile can be equal to one minus the rate value.

In some implementations, the constraint can include a desired relationship between a predicted positive rate of the machine-learned classification model on the subset of the training dataset and the rate value.

As examples, the estimator of the quantile function can be an L-estimator of the quantile function or a point estimator of the quantile function. As one example, the estimator of the quantile function can be a kernel quantile estimator of the quantile function (e.g., a Gaussian kernel quantile estimator). As another example, the estimator of the quantile function can be an interval quantile estimator of the quantile function.

In some implementations, optimizing the unconstrained objective function in which the decision threshold of the machine-learned classification model is expressed as the estimator of the quantile function can include minimizing an unconstrained surrogate loss function in which the decision threshold of the machine-learned classification model is expressed as the estimator of the quantile function.

In some implementations, optimizing the unconstrained objective function in which the decision threshold of the machine-learned classification model is expressed as the estimator of the quantile function can include, for each of a plurality of iterations: determining a gradient of the unconstrained objective function in which the decision threshold of the machine-learned classification model is expressed as the estimator of the quantile function; and updating one or more of a plurality of learnable parameters of the machine-learned classification model based at least in part on the determined gradient.

At 606, the computing system can deploy the trained machine-learned model. For example, the machine-learned model can be used to perform any of the applications described in section 1, including, for example, abusive content detection.

Figure 7:
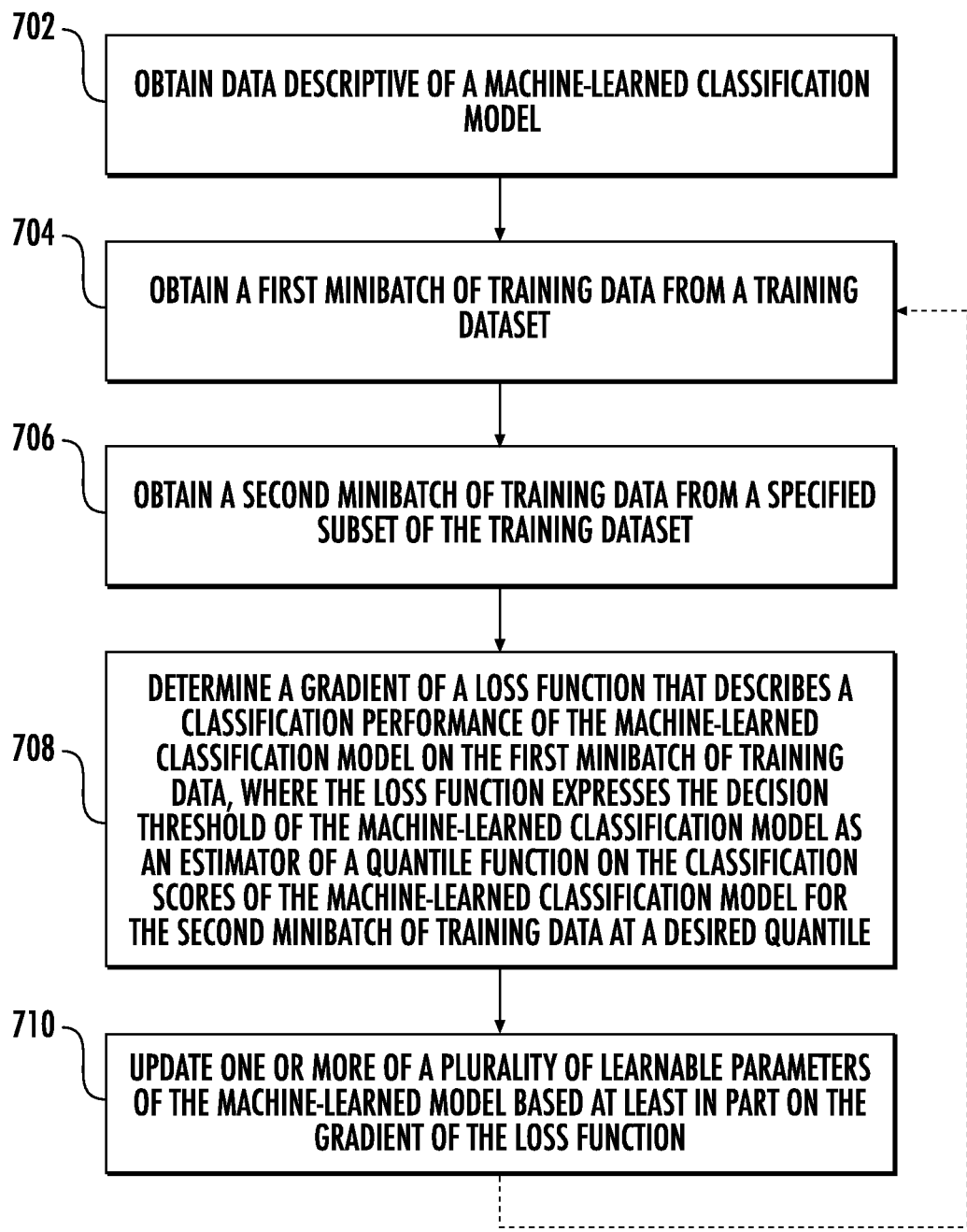
FIG. 7 depicts a flow chart diagram of an example method to train a machine-learned classification model according to example embodiments of the present disclosure.

FIG. 7 depicts a flow chart diagram of an example method 700 to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system obtains data descriptive of a machine-learned classification model. For example, the machine-learned classification model can be configured to produce a classification score for an input and to classify the input by comparing the classification score to a decision threshold.

At 704, the computing system obtains a first minibatch of training data from a training dataset. At 706, the computing system obtains a second minibatch of training data from a specified subset of the training dataset.

At 708, the computing system determines a gradient of a loss function that describes a classification performance of the machine-learned classification model on the first mini-batch of training data, where the loss function expresses the decision threshold of the machine-learned classification model as an estimator of a quantile function on the classification scores of the machine-learned classification model for the second minibatch of training data at a desired quantile.

In some implementations, the desired quantile is based at least in part on a rate value associated with the constraint. As one example, the desired quantile can be equal to one minus the rate value.

In some implementations, a constraint to be satisfied can include a desired relationship between a predicted positive rate of the machine-learned classification model on the subset of the training dataset and the rate value.

As examples, the estimator of the quantile function can be an L-estimator of the quantile function or a point estimator of the quantile function. As one example, the estimator of the quantile function can be a kernel quantile estimator of the quantile function (e.g., a Gaussian kernel quantile estimator). As another example, the estimator of the quantile function can be an interval quantile estimator of the quantile function.

At 710, the computing system updates one or more one or more of a plurality of learnable parameters of the machine-learned classification model based at least in part on the gradient of the loss function. For example, the parameters can be updated according to an update step size applied to the gradient.

After 710 the method 700 can end or can iteratively return to 704. For example, steps 704-710 of method 700 can be performed iteratively until one or more one or more criteria are met. Example criteria include: when the loss function converges; when a threshold number of iterations have been completed; when a moving average of a total loss value is less than a threshold amount; when an iteration-over-iteration change in the total loss value is less than a threshold amount; and/or other various criteria.

8. Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for training a classification model to satisfy a constraint, the method comprising:
   obtaining, by one or more computing devices, data descriptive of the classification model, wherein the classification model is configured to produce a classification score for an input and to classify the input by comparing the classification score to a decision threshold; and
   training, by the one or more computing devices, the classification model and concurrently learning the decision threshold based at least in part on a training dataset;
   wherein training, by the one or more computing devices, the classification model comprises optimizing, by the one or more computing devices, an unconstrained objective function in which the decision threshold of the classification model is expressed as an estimator of a quantile function on the classification scores of the classification model for a subset of the training dataset at a desired quantile, wherein the desired quantile is based at least in part on a rate value associated with the constraint.

2. The computer-implemented method of claim 1, wherein the desired quantile is equal to one minus the rate value.

3. The computer-implemented method of claim 1, wherein the estimator of the quantile function comprises a kernel quantile estimator of the quantile function.

4. The computer-implemented method of claim 1, wherein the estimator of the quantile function comprises an interval quantile estimator of the quantile function.

5. The computer-implemented method of claim 1, wherein the estimator of the quantile function comprises an L-estimator of the quantile function or a point estimator of the quantile function.

6. The computer-implemented method of claim 1, wherein the constraint comprises a desired relationship between a predicted positive rate of the classification model on the subset of the training dataset and the rate value.

7. The computer-implemented method of claim 1, wherein optimizing, by the one or more computing devices, the unconstrained objective function in which the decision threshold of the classification model is expressed as the estimator of the quantile function comprises minimizing, by the one or more computing devices, an unconstrained surrogate loss function in which the decision threshold of the classification model is expressed as the estimator of the quantile function.

8. The computer-implemented method of claim 1, wherein the constraint comprises a precision at a fixed recall constraint and optimizing, by the one or more computing devices, the unconstrained objective function comprises minimizing, by the one or more computing devices, a sum, wherein the sum is the sum over all negative training examples in the training dataset of a logistic loss or a hinge loss, wherein the logistic loss or hinge loss is calculated by the classification score produced for such training example by the classification model minus an estimator, wherein the estimator is the estimator of the quantile function on the classification scores of the classification model for all positive training examples of the training dataset at the desired quantile.

9. The computer-implemented method of claim 1, wherein the constraint comprises a precision at a fixed predicted positive rate constraint and optimizing, by the one or more computing devices, the unconstrained objective function comprises minimizing, by the one or more computing devices, a sum, wherein the sum is the sum over all negative training examples in the training dataset of a logistic loss or a hinge loss, wherein the logistic loss or hinge loss is calculated by the classification score produced for such training example by the classification model minus an estimator, wherein the estimator is the estimator of the quantile function on the classification scores of the classification model for all training examples of the training dataset at the desired quantile.

10. The computer-implemented method of claim 1, wherein the constraint comprises a precision at a fixed predicted positive rate constraint and optimizing, by the one or more computing devices, the unconstrained objective function comprises minimizing, by the one or more computing devices, a sum, wherein the sum is the sum over all positive training examples in the training dataset of a logistic loss or a hinge loss, wherein the logistic loss or hinge loss is calculated by an inverse of the classification score produced for such training example by the classification model plus an estimator, wherein the estimator is the estimator of the quantile function on the classification scores of the classification model for all training examples of the training dataset at the desired quantile.

11. The computer-implemented method of claim 1, wherein the subset of the training dataset comprises an entirety of the training dataset.

12. The computer-implemented method of claim 1, wherein the subset of the training dataset comprises a portion of the training dataset that exhibits a particular feature value.

13. The computer-implemented method of claim 1, wherein optimizing, by the one or more computing devices, the unconstrained objective function in which the decision threshold of the classification model is expressed as the estimator of the quantile function comprises, for each of a plurality of iterations:
  determining, by the one or more computing devices, a gradient of the unconstrained objective function in which the decision threshold of the classification model is expressed as the estimator of the quantile function; and
  updating, by the one or more computing devices, one or more of a plurality of learnable parameters of the classification model based at least in part on the determined gradient.

14. The computer-implemented method of claim 1, further comprising:
  performing, by the one or more computing devices, the method of claim 1 for each of a plurality of labels such that the classification model is trained to be a machine-learned multi-label classification model.

15. A computing system, comprising:
  one or more processors; and
  one or more non-transitory computer-readable media that collectively store instructions that, when executed by the one or more processors cause the computing system to perform operations, the operations comprising:
    obtaining data descriptive of the classification model, wherein the classification model is configured to produce a classification score for an input and to classify the input by comparing the classification score to a decision threshold; and
    for each of a plurality of iterations:
      obtaining a first minibatch of training data from a training dataset;
      obtaining a second minibatch of training data from a specified subset of the training dataset;
      determining a gradient of a loss function that describes a classification performance of the classification model on the first minibatch of training data, wherein the loss function expresses the decision threshold of the classification model as an estimator of a quantile function on the classification scores of the classification model for the second minibatch of training data at a desired quantile, wherein the desired quantile is based at least in part on a rate value; and
      updating one or more of a plurality of learnable parameters based at least in part on the gradient of the loss function, wherein the one or more of the plurality of learnable parameters include both parameters of the classification model and the decision threshold.

16. The computing system of claim 15, wherein the desired quantile is equal to one minus the rate value.

17. The computing system of claim 15, wherein the estimator of the quantile function comprises a kernel quantile estimator of the quantile function.

18. The computing system of claim 15, wherein the estimator of the quantile function comprises an L-estimator of the quantile function.

19. The computing system of claim 15, wherein the constraint comprises a desired relationship between a predicted positive rate of the classification model on the specified subset of the training dataset and the rate value.

20. One or more non-transitory computer-readable media that collectively store instructions that, when executed by one or more processors, cause the one or more processors to perform operations, the operations comprising:
  obtaining data descriptive of a classification model, wherein the classification model is configured to produce a classification score for an input and to classify the input by comparing the classification score to a decision threshold; and
  training the classification model and concurrently learning the decision threshold based at least in part on a training dataset;
  wherein the operation of training the classification model comprises optimizing an objective function in which the decision threshold of the classification model is expressed as an estimator of a quantile function on the classification scores of the classification model for a subset of the training dataset at a desired quantile, wherein the desired quantile is based at least in part on a rate value associated with a constraint.

* * * * *